Sept. 19, 1944. C. F. GOUDY 2,358,704
PREFABRICATED OBSERVATION TOWER AND THE LIKE
Filed July 30, 1942 6 Sheets-Sheet 1
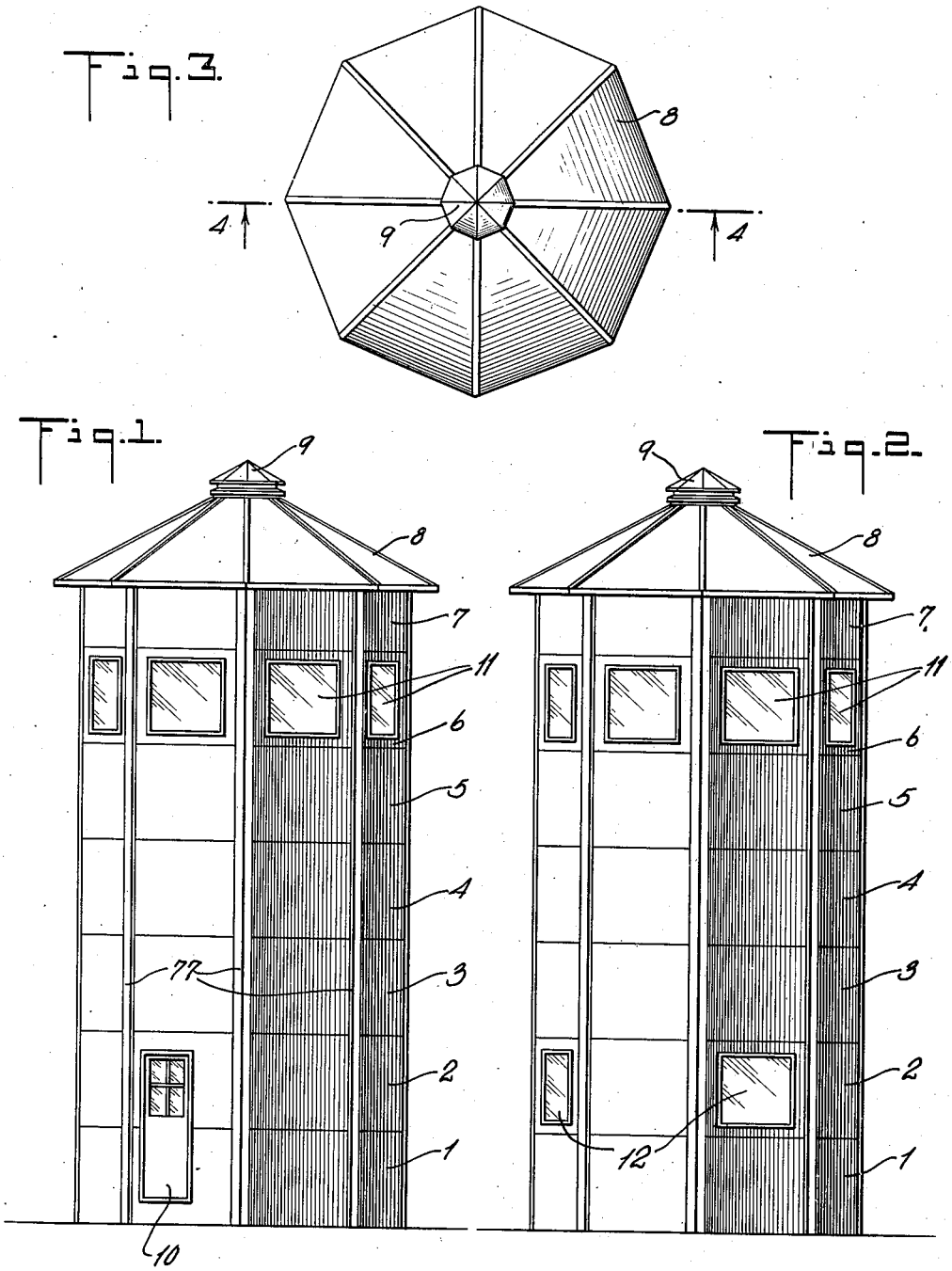
INVENTOR
CARL F. GOUDY
BY *John J. Logan*
ATTORNEY INVENTOR
CARL F. GOUDY
BY John J. Rogan
ATTORNEY

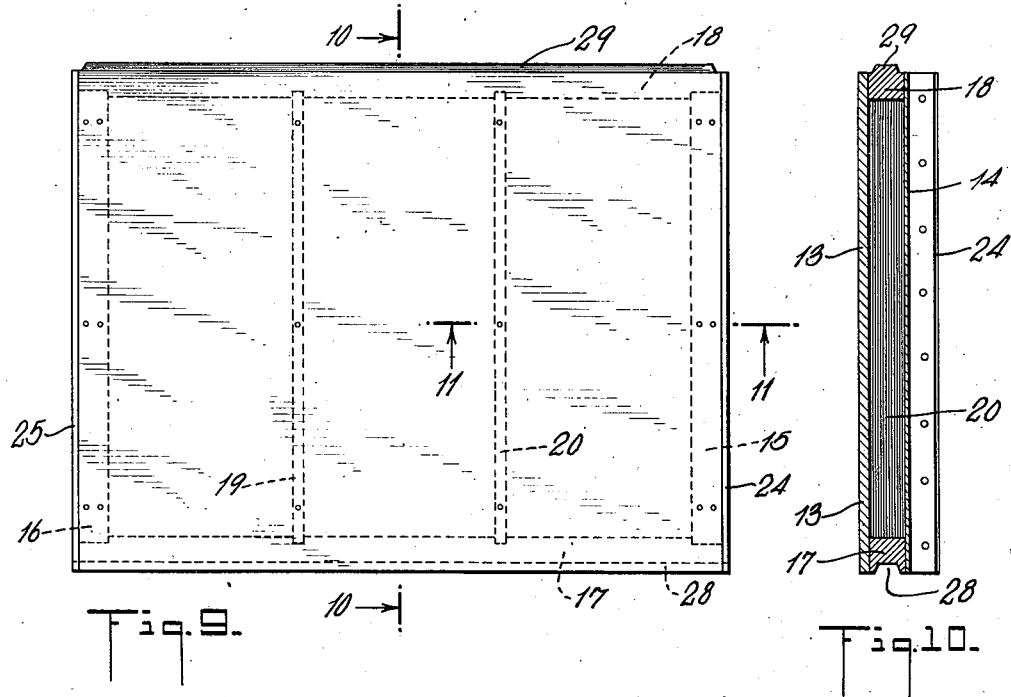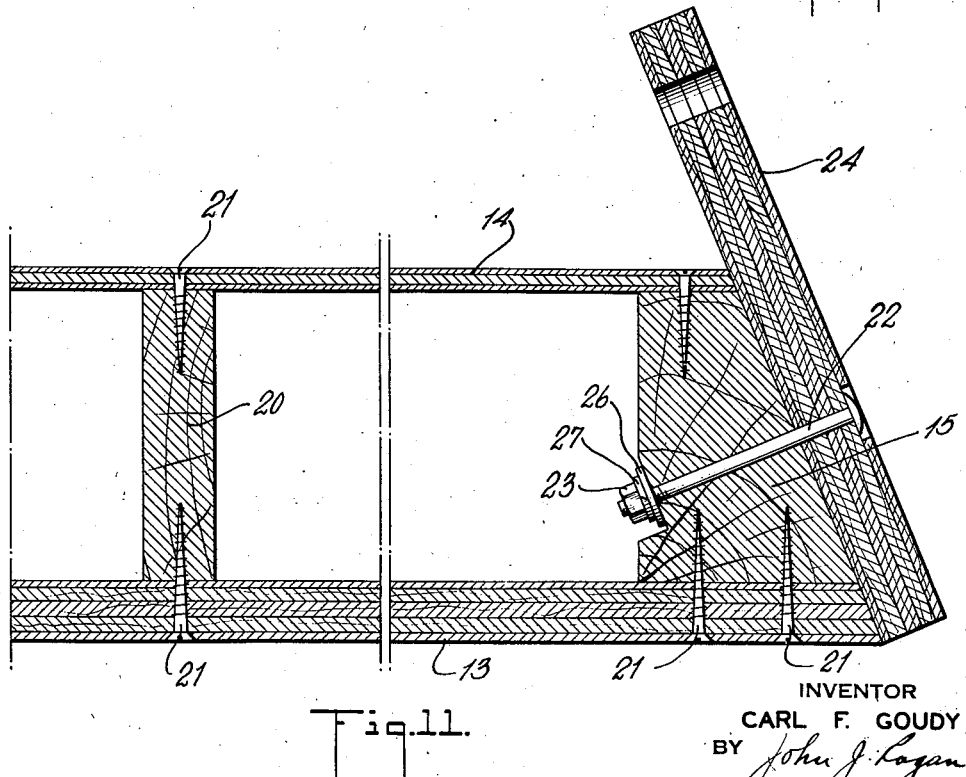

Sept. 19, 1944. C. F. GOUDY 2,358,704
PREFABRICATED OBSERVATION TOWER AND THE LIKE
Filed July 30, 1942 6 Sheets-Sheet 5

INVENTOR
CARL F. GOUDY
BY John J. Rogan
ATTORNEY

Sept. 19, 1944.     C. F. GOUDY     2,358,704
PREFABRICATED OBSERVATION TOWER AND THE LIKE
Filed July 30, 1942     6 Sheets-Sheet 6

INVENTOR
CARL F. GOUDY
BY *John J. Logan*
ATTORNEY

Patented Sept. 19, 1944

2,358,704

UNITED STATES PATENT OFFICE 2,358,704

PREFABRICATED OBSERVATION TOWER AND THE LIKE

Carl F. Goudy, Flushing, N. Y., assignor to Technical Appliance Corporation, New York, N. Y., a corporation of New York Application July 30, 1942, Serial No. 452,838

5 Claims. (Cl. 20—2)

This invention relates to housings for radio equipment and more especially to a readily assembled observation tower for housing ultra high-frequency apparatus.

In certain applications of ultra high-frequency radio transmission, it is necessary to provide a readily assembled structure or housing which is windproof and weatherproof and which does not interfere materially with the proper functioning of the ultra high-frequency equipment. This is particularly true in the case of radio range devices such as are used by the military authorities in locating aeroplanes and the like. Such housings or towers must be readily assembled and in many cases must be erected in locations where they are subject to heavy weather conditions. In view of the extreme sensitivity of the radio and allied apparatus that must be protected, it is highly important that the tower when assembled be able to withstand the most severe weather conditions and without affecting the sensitivity and reliability of the enclosed radio equipment.

Accordingly, it is a principal object of this invention to provide a prefabricated and readily assembled house or observation tower, for housing sensitive radio equipment, and which when assembled will withstand heavy weather conditions without affecting the sensitivity or reliability of such equipment.

Another object is to provide a prefabricated house or observation tower for radio range finder equipment and the like which is so constructed that all metal parts required to fasten the various prefabricated units are symmetrically disposed around a common central vertical axis.

Another feature relates to a prefabricated panel unit for constructing windproof and weatherproof housings such for example as observation towers such as used in radio finding and the like.

A further feature relates to the novel organization, arrangement and relative interconnection of parts which constitute a quickly assembled housing or observation tower.

Other features and advantages not specifically enumerated will be apparent after a consideration of the following detailed descriptions and the appended claims.

In the drawings which show certain preferred embodiments,

Fig. 1 is a front view of an octagonal observation tower according to the invention.

Fig. 2 is a rear view of Fig. 1.

Fig. 3 is a top-plan view of Fig. 1.

Fig. 9 is a front view of one of the panel units according to the invention.

Fig. 10 is a sectional view of Fig. 9 along the line 10—10 thereof.

Fig. 11 is an enlarged sectional view of Fig. 9 taken along the line 11—11 thereof.

Figure 4:
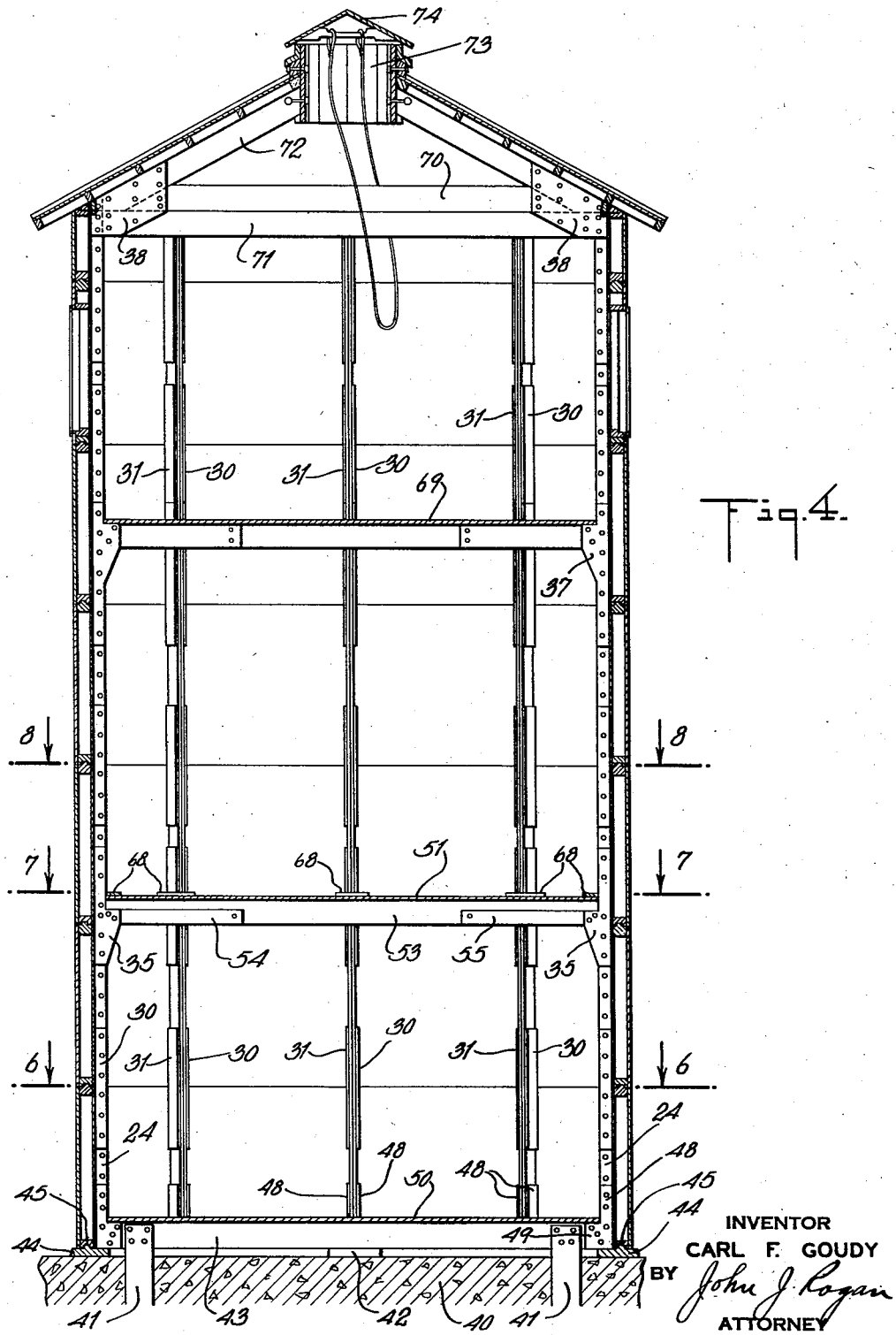
Fig. 4 is a vertical section of Figs. 1 and 3 taken along the line 4—4 of Fig. 3.

In the preferred form of the invention, the housing or tower is octagonal in shape in order to provide the greatest mechanical rigidity consistent with ease of prefabrication and assembly of the various panel units. The tower is composed of a series of superposed interlocked panel units forming seven tiers 1 to 7 (Figs. 1 and 2). The tiers 1 are anchored to a suitable foundation, while the tiers 7 are closed off by a specially constructed roof 8 having a removable hatch cover 9. The tower is constructed so as to be symmetrical with respect to a central vertical axis along which the radio antenna is located. This radio antenna may be of any known design, for example in the form of a vertical rod. I have found that in addition to fulfilling the necessary mechanical requirements of rigidity, rapidity of assembly and weatherproof qualities, it is also important that the tower be constructed with a minimum of metal parts which would tend to affect the sensitivity or reliability of the radio equipment. This is particularly important where the radio antenna is of the directional type and is being excited at ultra high frequency. In accordance with one feature of the invention, substantially the only metal parts used in assembling the tower are the screws or bolts, all of which are vertically and symmetrically disposed around the central axis of the tower. By using a special panel design and method of assembly to be described, it is possible to locate all these fastening screws, bolts and tie members symmetrically around the central antenna so that the field pattern of the antenna is accurately controllable.

Preferably, the two lower tiers 1, 2, on one side of the tower are cut out to provide space for a suitable door 10, while the sides of tier 6 are provided with observation windows 11. If desired some of the lower tiers e. g. tier 2 on one or more sides, may also be provided with windows 12. In the particular embodiment disclosed, the tower is divided into three vertical compartments or floors and preferably the control equipment is located in the lowermost compartment, it being understood that the radio antenna from this control equipment extends vertically through the floor or floors of one or more of the upper compartments and centrally thereof.

Figure 15:
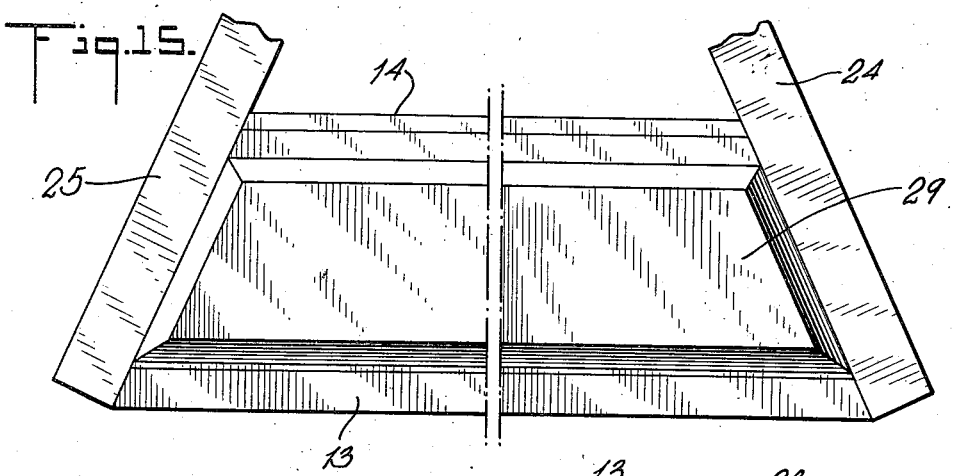
Fig. 15 is a top-plan view of Fig. 14.
Figure 16:
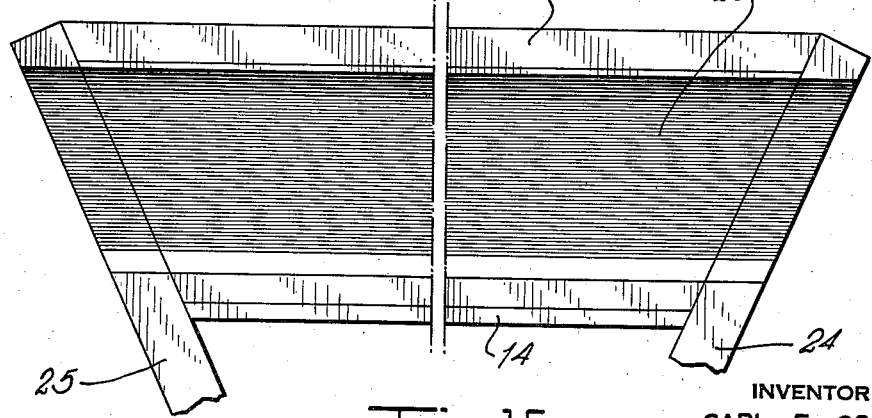
Fig. 16 is a bottom view of Fig. 14.

In accordance with the invention, all the individual panels of which the tiers are formed are identical in construction with the exception that the uppermost tier 7 are vertically shorter than the tiers 1 to 6. In the preferred embodiment of an octagonal tower, the panels are constructed so that when fitted and interlocked they form the desired octagonal shape. Referring to Figs. 9 to 11 and 14 to 16, the constructions of one of these panels is shown. It consists of an outer sheathing 13 of plywood of the desired thickness, and an internal sheathing 14 also of plywood which may be of lesser thickness. Sheathings 13 and 14 are fastened to a wood frame comprising vertical end members 15, 16, and horizontal tie members 17 and 18 which are fitted together as shown in Fig. 9. A pair of intermediate vertical braces 19 and 20 also extend between members 17 and 18 and are interlocked therewith. All the parts thus far described are of wood. The sheathings 13 and 14 are fastened to the members 15—20 by wood screws 21. The end members 15 and 16 as well as the sheathings 13 and 14 are cut at an angle of approximately 67.5° (Fig. 11), and fastened to the inclined outer faces of members 15 and 16 by bolts 22 and nut 23 are respective plywood ribs or fins 24, 25 (Figs. 11, 15 and 16). The surfaces of ribs 24 and 25 where the bolts 22 pass, are undercut to allow the bolt heads to lie below the surface so that abutting ribs 24, 25, of adjacent panels can be tightly assembled. In order to provide a tight joint, the inside faces of members 15 and 16 where the bolts 22 pass, are cut away to form a recess having a face perpendicular to the bolt, a suitable thrust washer 26 and lock washer 27 being provided for nut 23.

Figure 12:
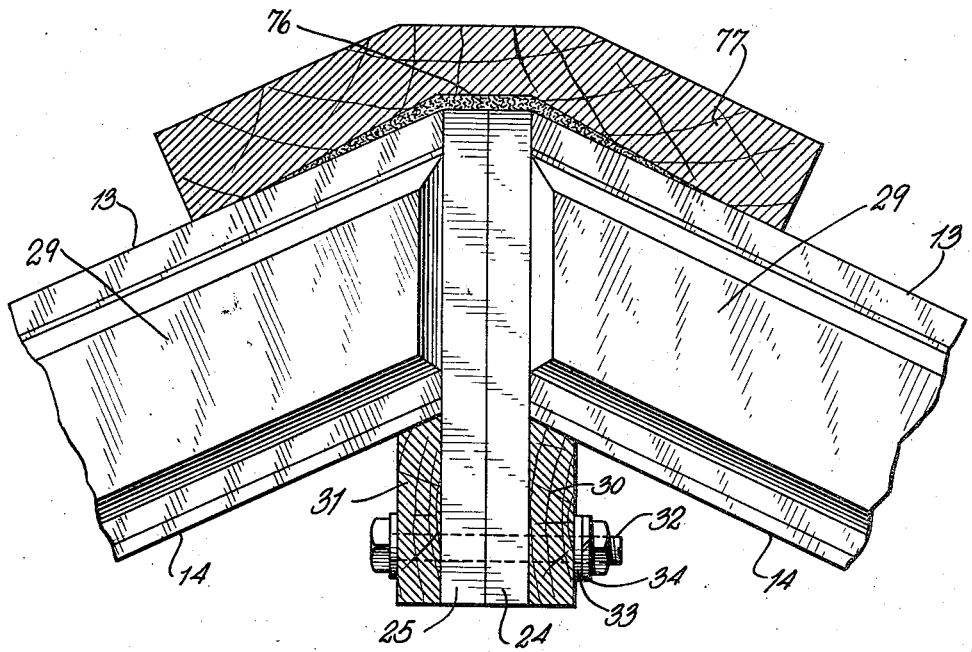
Fig. 12 is an enlarged view of the panel unit to explain the manner of assembly.

The lower exposed face of member 17 has a central longitudinal groove 28 with inclined sides, this groove extending throughout the length of said member 17. The upper exposed face of member 18 has a tongue 29 which is trapezoidal in shape, and has its longitudinal sides and lateral sides tapered corresponding to the taper of the sides of the groove 28. In the case of an octagonal tower the ends of tongue 29 are cut at an angle of approximately 67.5°. The ribs 24, 25, are provided with a series of vertically spaced holes to receive fastening bolts, whereby adjacent panels can be rigidly locked together. For this purpose, there are provided pairs of rigid flat wooden tie members 30, 31, each having a series of holes to register with the holes in abutting ribs 24, 25 of adjacent panels of adjacent tiers (Fig. 12). These tie members vertically overlap the abutting edges of the vertically aligned fins 24, 25, and are rigidly fastened in place by bolts 32, with respective thrust washers 33 and lock washers 34.

In assembling the tower, the panels are uniformly assembled with the tongues 29 uppermost so that these tongues register with the corresponding grooves 28 in the bottom of the next superposed panel.

The tie members which unite the second and third tiers of panels, instead of being of uniform width have a ledge-like projection 35 to provide a support for the second floor 56 (Fig. 4). Likewise, the tie members which unite the fourth and fifth tiers have projections 37 to provide support for the third floor 69. Likewise, the tie members which unite the sixth and seventh panels have projections 38 to support the roof structure.

Figure 5:
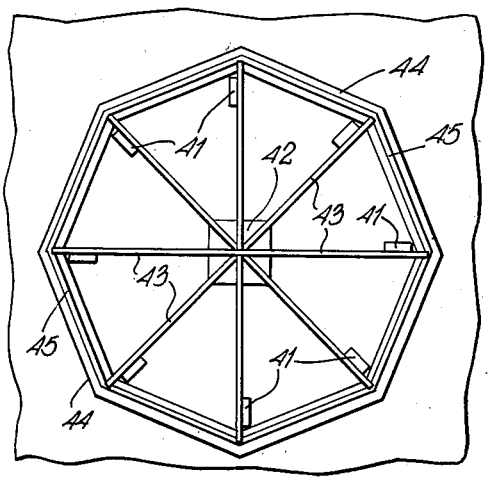
Figs. 5 to 8 are respective cross-sectional views along the lines 5—5, 6—6, 7—7, 8—8 of Fig. 4.

Referring to Figs. 4 and 5, a description will now be given of the method of assembly. A foundation 40 preferably of poured concrete or the like, has set into it a series of eight vertically extending flat metal anchors 41, and includes a central vertical pillar 42. The upper ends of anchors 41 have a series of bolt receiving openings by means of which the wood floor joints 43 are locked in place. An octagonal flat wood sill 44 formed of eight wood strips abutting at their ends, is anchored in any suitable manner to the foundation 40. Sill 44 has a tongue 45 extending around its upper surface, the shape of which is cut to correspond to the shape of grooves 28 in the bottom edges of the panels.

Figure 6:
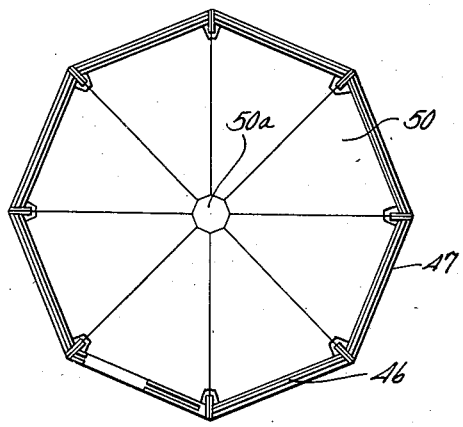

The first pair of panels 46, 47 (Fig. 6) of the first tier are then assembled with their grooves 28 registering with the corresponding tongue 45 on the sill. The tie members 48 are then fastened in place to lock the adjacent ribs 24 and 25 together. The tie members 48 also have horizontal inwardly projecting portions 49 which are bolted to the floor beams 43. The floor 50 is made up of eight triangular fitted sections which are cut at their pointed ends to provide a central octagonal cut out into which is tightly fitted the octagonal wood piece 50a (Fig. 6). Likewise the floor sections have respective cutouts so as to accommodate the inwardly projecting portions of the ribs 24, 25, with the tie members 48. The succeeding panels of the first tier are assembled and locked in a similar manner by their respective tie members, and the successive vertically arranged tiers are likewise assembled and fastened. The second floor 51 (Figs. 4 and 8) is supported on the floor beams 52 and 53 (Fig. 7), which in turn are bolted to the horizontal struts 54, 55, which are bolted to the projections 35 on the tie members which unite the second and third tiers of panels. The floor 51 consists of eleven closely fitted removable sections 57—67. The two center sections 61, 62, each has a central semicircular cutout to define a central opening through which may pass the vertical antenna of the radio equipment which is located in the lower compartment. The edges of the floor sections 57, 59, 65 and 67, are recessed to receive the ribs 24, 25, with their tie members 30, 31, and preferably U-shaped sealing members 68 of wood-felt or the like seals the joints in order to render the lower compartment as soundproof as possible. If desired, one of the sections 60, 63 or 64, may be hinged to provide a trap door between the first and second compartments.

Figure 7:
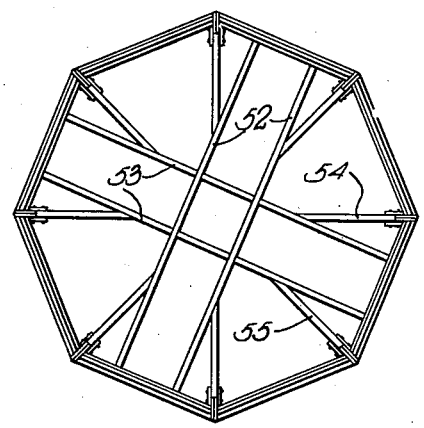
Figure 8:
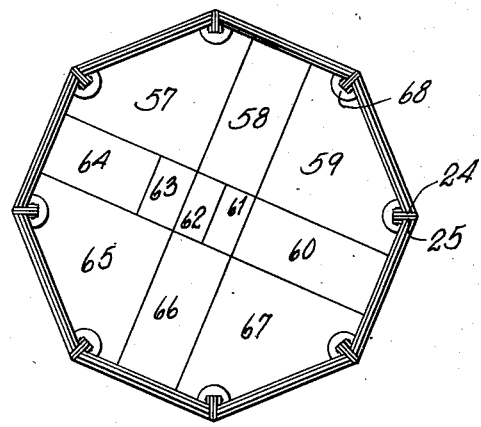
Figure 8A:
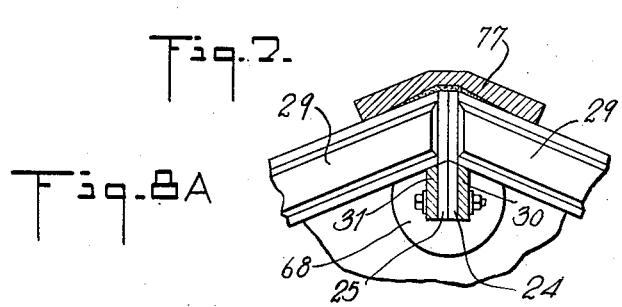
Fig. 8a is an enlarged view of a portion of Fig. 8.

The third floor 69 may be of the same construction as floor 51 being supported in a similar way by floor beams and braces similar to the members 52—55 (Fig. 7).

The tie members which unite the sixth and seventh tiers of panels carry the inclined projections 38 to which are bolted the horizontal roof beams 70, 71, and the rafters 72. The rafters 72 are cut at their upper ends to provide an octagonal opening to receive the octagonal wooden hatch 73 which is nailed to the rafters so as to be in alignment with the central axis of the tower.

A removable water-tight hatch cover 74 is provided and has a rope 75 attached thereto, the lower end of which may be suitably anchored within the tower. The roof is finished in any suitable manner by sheathing and a coating of waterproof roofing material, it being understood that all joints and corners are properly sealed by a suitable waterproof compound.

The outer or exposed portion of the vertical joints where the parts abut (Fig. 12) may be coated with a sealing compound 76, and V-shaped wood molding strips 77 extend the full length of the corner joints as shown in Figs. 1 and 2. Because of the tight interlocking fit between the horizontal edges of adjacent panels, no additional sealing material is required therebetween.

Figure 13:
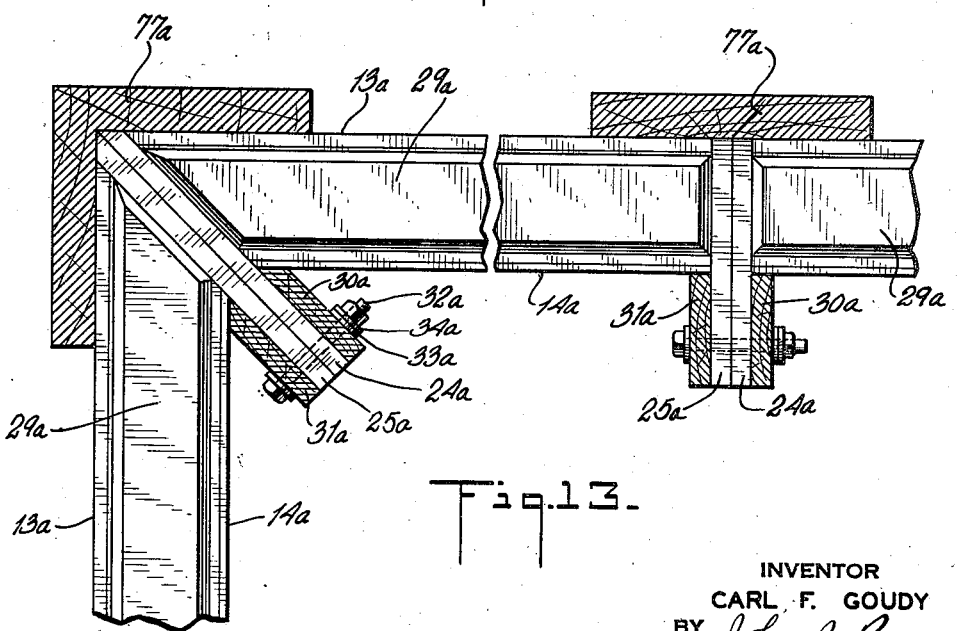
Fig. 13 is a modification for constructing a rectangular tower.
Figure 14:
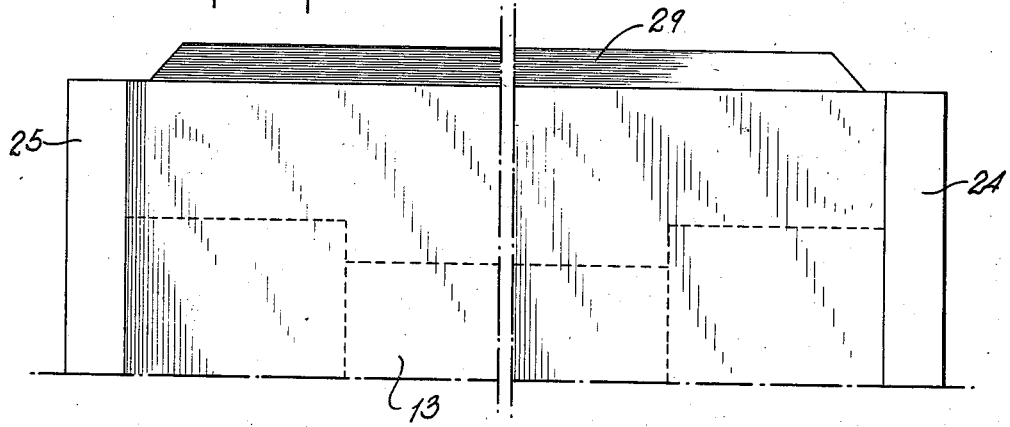
Fig. 14 is an enlarged front view of the upper portion of one of the panel units.

While in the foregoing the tower is of octagonal shape, it will be understood that any other shape may be employed. For example, if a square or rectangular tower is required, the panels may be straight at one vertical edge with the ribs 30a, 31a, perpendicular to the panels, while the opposite vertical edge may be cut at an angle of 45° as shown in Fig. 13, where corresponding parts to those of Fig. 12 bear similar designation numerals with letter exponents.

While the tower finds its primary utility in connection with the housing of highly sensitive radio equipment, it will be understood that certain features of the construction may equally well be adapted to the construction of any other form of housing.

Various changes and modifications may be made in the disclosed embodiments without departing from the spirit and scope of the invention.

Thus, the eight wood strips forming cell 44 instead of being first anchored to the foundation, may form part of the first tier by being glued and bolted to the grooved lower rail of the first tier panels. Anchorage of the first tier then results from the attachment to the first floor beams 43 and members 49. Likewise the roof of the housing may be constructed as a separate complete unit in which event the separate and additional sheathing and coating of a water-proof roofing materially is not necessary provided all the corners and joints are properly water-proofed by suitable compound.

What I claim is:

1. A prefabricated housing comprising a plurality of superposed tiers of panels each panel having a grooved lower edge and a complementary tongued upper edge, and fastening ribs on the vertical edges of said panels extending radially inward of the housing, and tie members fastened to adjacent pairs of panels in a tier and to adjacent panels in adjacent tiers, certain of said tie members have floor supporting struts removably attached thereto.

2. A prefabricated housing according to claim 1 in which said tie members are in the form of separate flat wooden members which overlap the adjacent ends of the said ribs on vertically adjacent panels, and when tightened in place act to pull the adjacent panels together.

3. A prefabricated housing according to claim 1 in which each of said panels has a trapezoidal groove on one horizontal edge and a trapezoidal tongue on the opposite edge.

4. A prefabricated sectional wall comprising at least two tiers of wood panels each consisting of at least two adjacent panels all of said panels being of the same construction and each panel having one horizontal edge with a tapered tongue and the opposite horizontal edge with a tapered groove, each panel having anchoring ribs permanently attached to the opposite vertical edges and in the form of flat wooden members extending beyond the face of the panel, said panels being assembled so that the anchoring ribs of the tiers are in vertical alignment, and removable flat tie members overlapping the said aligned ribs, each tie member having a plurality of openings to register with the openings in said ribs to receive anchoring bolts, each tie member serving to anchor two adjacent panels of a tier together while anchoring the said two adjacent panels to the adjacent panels of the next tier.

5. An all wood prefabricated housing comprising a plurality of tiers of similar non-metallic panels, each panel having one horizontal edge grooved and the opposite horizontal edge tongued whereby the panels can be superposed in tiers in interlocking relation, non-metallic anchoring ribs permanently attached to each panel and extending inwardly of the housing, said panels being assembled with said ribs in vertical alignment, removable non-metallic tie members for uniting adjacent vertically aligned ribs, at least one floor section supported from said tie members, said floor having a central opening, metal bolts for fastening said tie members to said aligned ribs, all said bolts being substantially symmetrically positioned around said opening.

CARL F. GOUDY.